March 23, 1943.     L. MORTEN     2,314,727
ELECTRICITY CONDUCTOR UNIT WITH FIXED SOCKET-END CONDUCTORS
Filed Feb. 23, 1940

INVENTOR
Louis G. Morten
HIS ATTORNEY

Patented Mar. 23, 1943

2,314,727

UNITED STATES PATENT OFFICE 2,314,727

ELECTRICITY CONDUCTOR UNIT WITH FIXED SOCKET-END CONDUCTORS

Louis G. Morten, Teaneck, N. J., assignor to John B. Pierce Foundation, New York, N. Y., a corporation of New York Application February 23, 1940, Serial No. 320,242

5 Claims. (Cl. 174—98)

This invention relates to improved electricity conductor systems.

In particular, the present invention relates to improved conductor-containing units of an electrical conduit system embodying serially connected component units, such serially connected units comprising either alternatively connected "run" and "connector" units, or, serially interconnected "run" units, with "connector" units inserted and interconnected into the system at suitable locations, such as a location where it is desired to fasten the electrical conduit system to a baseboard, studding, or like structural element of a building.

It is an object of the present invention to provide "run" units and "connector" units for an electrical conduit system, embodying conductors having socketed ends disposed in uniform and permanently affixed relationship to the periphery of the end faces of the respective units, whereby accuracy of positioning of the units and complete interchangeability of units is obtained.

It is a further object of the present invention to provide conductor-containing units of an electricity conductor system wherein the conductors thereof are maintained in insulated spaced relationship within the body of the unit through the agency of transverse end walls of the respective units and the positioning of end members of the conductors within such transverse end walls.

It is another object of the invention to provide conductor-containing units for an electricity conductor system, the bodies of such units being wholly of electrical insulation material or optionally, of metal; the invention providing, in the latter construction, end walls of insulating material serving to act as an insulating barrier between the metallic, i. e., electrically conductive, body portions of such units.

It is a further object of the invention to provide conductor-containing units of an electrical conduit system in which the respective units are electrically and mechanically interconnected by push pins, the conductors of the said units being securely anchored against lateral displacement during the connecting or disconnecting operation by engagement of the ends of such conductors with the transverse end walls of the units.

In the present invention, the seriatim-connected wiring units may comprise a "run" unit, of extended and preferably standard length, and a "connector" unit, substantially shorter in length than the "run" unit. The run units may have various constructions, two such constructions being illustrated and described hereinafter. One form comprises a two part hollow body of electrical insulation material and provided with integral end walls having cooperating grooves within which tubular end portions of the conductors of the run unit are fixedly secured in predetermined uniform relationship with respect to the periphery of the end faces of the unit.

A second form of run unit may comprise a substantially hollow body of metal having integral top, side, and bottom walls, and provided with end closure means of electrical insulation material, said end closure means providing for the fixed uniform positioning of end portions of the conductors of such unit.

For cooperation with such run units in seriatim interconnection of the electrical conduit system, there may be employed connector units, comprising a body of electrical insulation material provided with electricity conductors securely fixed therein in predetermined uniform relationship and in registry with the conductors of the run units.

Interconnection of the run units with the connector units, or the interconnection of two successive run units may be effected by push pins of electrically conductive material, desirably tapered to provide a tight frictional engagement with the inner walls of the tubular end portions of the conductors.

Such seriatim interconnection may impose a substantial axial or longitudinal strain upon the conductors, both during the stages of connecting and disconnecting the units, and it is a characteristic of the present invention that the conductors are anchored at the end walls of the units to preclude displacement in any degree.

Other features and advantages will hereinafter appear.

In the drawing:

Figure 2, however, illustrates, in section, the cap and base elements comprising the body of each unit;

Figure 1:
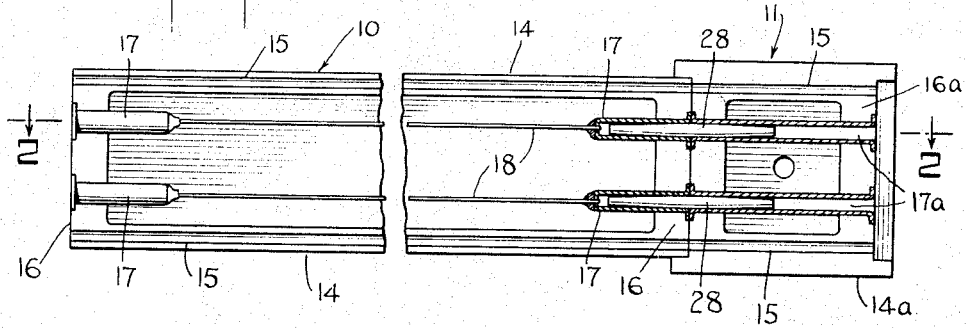
Fig. 1 is a plan view, partly in section, of one type of seriatim interconnected electricity conductor units embodying the essentials of the present invention, the cap elements of the bodies of such units having been removed to reveal the disposition of the conductors therein.

In the accompanying drawing, Fig. 1 indicates a plan view of an interconnected run unit 10 and connector unit 11, said units representing typical units for seriatim electrical and mechanical interconnection with other units of like characteristics to form a continuous wiring system.

In the embodiments typified by Fig. 1, it is desirable to form the bodies of such units in two parts; the base portion 12 of run unit 10 and the base 12a of connector unit 11 are preferably of electrical insulation material of the nature of suitable molded plastic. Such base portions are advantageously imperforate, and may be made by known molding processes. Side walls 14, 14a, of units 10, 11 respectively, have longitudinally arranged tongues 15, 15, or equivalent, formed therein, the tongues of the respective units being in mutual registry and alignment.

Figure 2:
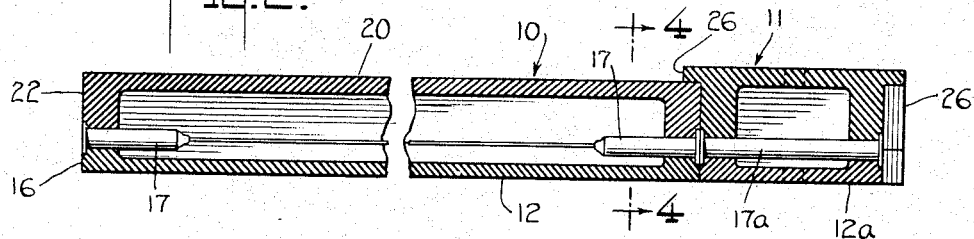
Fig. 2 is a sectional elevation of the assembled units pursuant to Figure 1.
Figure 3:
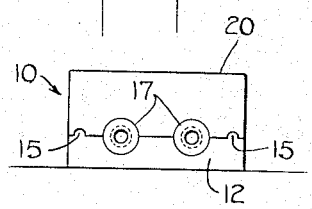
Fig. 3 is an end view of a conductor run unit.
Figure 4:
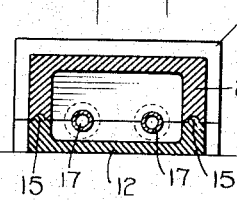
Fig. 4 is an end elevation of an interconnected run and connector unit, the run unit being in section as per the lines 4—4 of Fig. 2.
Figure 5:
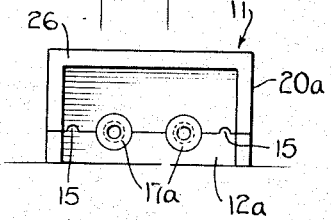
Fig. 5 is an end view of a connector unit.

End walls 16, 16a of the respective base portions, see Figs. 2 and 3, are provided with hemi-cylindrical longitudinal grooves, suitably countersunk at the outer faces thereof.

With respect to unit 10, such grooves snugly receive and accurately and uniformly position tubular conductors 17, 17, disposed at each such transverse end wall. As clearly appears in Fig. 1, such tubular conductors 17, 17 are electrically interconnected, as by the wires 18, or by rods, tubes or equivalent, of suitable electricity conducting material.

In unit 11, the relative shortness thereof renders it impracticable to employ tubular conductors interconnected by rods, wires or the like; in such unit, tubes 17a are employed, said tubes fitting snugly within the hemi-cylindrical grooves, and beaded or flanged into the countersunk portions of such grooves, as illustrated. As clearly appears, tubes 17a of unit 11 are equal in internal diameter to tubular conductors 17; tubes 17a, also, are positioned in uniform and precise registry with tubular conductors 17 of unit 10, whereby any unit 11 may be serially interconnected with any unit 10.

The body of each electricity conductor unit is completed by a cap member; cap member 20 of unit 10 has a preferably imperforate upper wall and side walls which engage with the side walls of base member 12. The cap member walls are formed with suitable grooves complementary with the tongues 15 of the base section, to afford a tongue and groove association of the respective cap and base elements of the unit body. As is apparent from Figs. 2 and 3, end walls 22 of cap member 20 are provided with complementary hemi-cylindrical grooves having countersunk portions at the outer ends. The respective hemi-cylindrical grooves in the cap and base portions cooperate to form a cylindrical passage wherein the tubular ends 17 of the electrical conductors within the unit 10 are rigidly and securely confined.

Likewise, the side walls of cap member 20a of unit 11 have grooves for interfitting relation with tongues 15 of the base portion, and the end walls of cap member 20a have complementary hemi-cylindrical grooves for cooperation with like grooves in base 12a to form cylindrical passages within which are snugly and securely confined the tubular conductors 17a.

Desirably, the ends of the socketed connectors 17 of unit 10 and the tubular connectors 17a of the connector unit 11 are flanged or beaded over into the countersunk end faces of the grooves, whereby such connector elements are additionally held against accidentaly displacement, and thereby maintained in accurate uniform predetermined relationship with respect to the periphery of the end faces of the respective units.

In assembling a conductor unit of either the run or connector types, the conductor elements thereof may be preformed, and placed within the hemi-cylindrical grooves at the respective transverse walls of the base portions. Subsequently, the respective cap portions of the run or connector units may be placed in position, the tongue and groove relationship of the side walls thereof insuring a proper fit of the respective elements. If desired, the cap and base portions may be adhesively secured, or, pursuant to known molding practices, the cap and base portions may be originally formed in partially cured status, the conductor units assembled, and then subjected to completion of the cure. Pursuant to such practice, the cap and base elements of the units may be molded into substantially integral form. It will be noted that connector unit 11 is provided with a projecting side and top wall structure 26, such projections cooperating with the end faces of walls 16a to form a socket into which the end of a run unit 10 may interfit, thus affording a broken joint effective to shield the conductors of the seriatim interconnected units, on at least the three normally exposed sides thereof, from accidental external contact.

As appears from Fig. 1, electrical and mechanical interconnection of the units 10 and 11 may be made through the agency of electrically conductive pins 28, 28, or equivalent. Desirably such pins are tapered at each end to afford a wedge fit internally of the sockets 17 and tubular conductors 17a to insure satisfactory transmission of electricity through the assembled conductor units.

Figure 6:
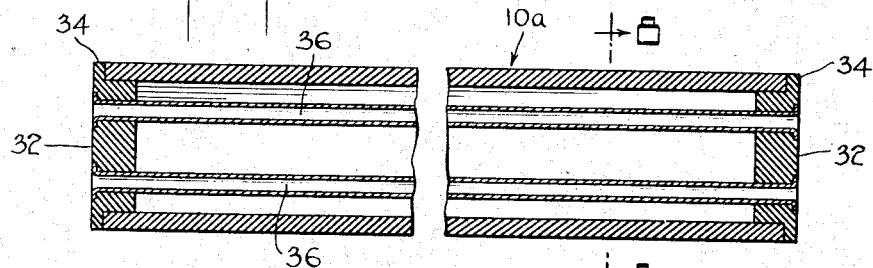
Fig. 6 is a plan sectional view of a second form of conductor run unit.
Figure 7:
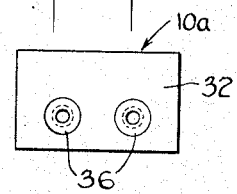
Fig. 7 is an end view of the conductor run unit of the Fig. 6 type.
Figure 8:
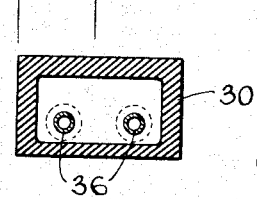
Fig. 8 is a sectional elevation of such Fig. 6 conductor unit, taken on the lines 8—8 of Fig. 6.

In the run unit embodiment illustrated in Fig. 6, the unit 10a comprises a tubular body portion 30, with which are operatively associated end closure means 32, 32, of electrical insulation material. Desirably, the external body dimensions of unit 10a are similar to dimensions of unit 10. The body 30 may be formed from plastic or like material having suitable dielectric properties, although it is obvious that the use of insulating end closure means 32 affords adequate electrical insulation of the conductors with respect to the body 30. Body 30, therefore, may be of metal if such material is more suitable for a particular installation condition.

It is noted that each end closure means 32 is formed with a peripheral flange 34, which, being of electrical insulation material, imposes a wall of electrical insulation material between bodies 30, in the circumstance that two of the run units are interconnected without the intervening agency of a connector unit 11. Therefore, in the further circumstance that the bodies 30 are of metal or like conductive material, it is seen that the passage of electricity along the metallic body, as by accidental short circuit, is confined to one run unit.

Preferably, the conductors 36, 36 are tubes of copper or equivalent electricity conducting material, such tubes being flanged at their ends to occupy countersunk areas in the insulating end members 32, 32.

In assembling a unit of the Fig. 6 type, the tubular conductors 36, 36, one end of each of which is flanged, may be passed through the longitudinal cylindrical openings in an end closure member 32 and such closure member and its therein positioned conductors secured to one of the ends of the tubular body 30. Subsequently, the opposite end closure member 32 may be passed over the tubular conductors and suitably secured to the tube 30, whereupon the ends of the respective tubular conductors may be flanged to secure the same within such end closure member 32. In this construction, the flanged portions of conductors 36, 36 permanently position the end plugs 32, 32 with respect to the body 30, and thereby not only hold the conductors 36 in uniform position, but prevent an accidental separation of the assembled unit.

It will be noted that the flanged ends of the tubular conductors 36, or 17a, and the socketed conductor elements 17, prevent an inward displacement of the stated conductors during the assembly of one unit with another. Such securement against displacement is advantageous, when it is considered that the connector pins 28, 28 fit within the conductors with a very tight frictional fit, and that the insertion of such pins imposes a substantial axially directed strain on the conductors of any of the types of units.

It will be noted, further, that regardless of such axial strains, the rigidity and uniformity of positioning of the conductors of the respective units through the agency of the end walls of such units and the flanged association of the conductor ends therewith maintains the paired conductors in uniform mutually insulated status, thereby rendering it unnecessary to provide the conductors with individualized insulating coatings.

Additionally, the uniformity and permanence of position of the ends of the conductors in respective units affords complete interchangeability of either of the illustrated forms of run unit and connection thereof with connector unit 11.

It will be apparent that a plurality of units 10 or 10a, or units 10 and 10a may be serially interconnected without the intermediary connector units 11, under installation conditions, for example where the broken joint protection afforded by the overhanging end walls 26 of connector units 11, is not required.

Connector units 11 may serve to fasten the seriatim-connected conduit system to a baseboard, wall, studding, or like structural element of a building, as by passage of a wood screw or the like through the illustrated screw passages in the body of such unit 11.

Whereas I have described my invention by reference to specific forms thereof, it will be understood that many changes and modifications may be made without departing from the spirit of the invention.

I claim:

1. An electricity conductor unit for seriatim electrical and mechanical interconnection with other units of like characteristics to form a continuous wiring system, comprising the combination with a substantially hollow body comprising mutually separable cap and base portions, each said body portion having end walls of electrical insulation material, said end wall portions being provided with registering grooves which form tubular passages in mutual axial alignment, of electricity-conducting socket means extending through said tubular passages, each said socket means having an integral continuous flange at its outer end in engagement with the outer surface of said end walls over a substantial area, the body of each socket being of uniform diameter throughout its length, and electricity conductors extending from the socket means at one end wall to the socket means at another and connected thereto with minimum of slack to afford electrical and mechanical connection therebetween to restrain said interconnected socket means against displacement with respect to said end walls, said electricity conductors being in mutually insulated spaced relationship.

2. An electricity conductor unit for seriatim electrical and mechanical interconnection with other units of like characteristics to form a continuous wiring system, comprising the combination with a two-part substantially hollow body, each body part having wall means of electrical insulation material at each end thereof to register with corresponding wall means of the other body part to form end closures for the hollow body, of a plurality of substantially non-yieldable electricity conducting socket means extending through said end body closures, each such socket means having its outer end flanged for engagement with the respective end closure over a substantial area, and electricity conductor means disposed within said hollow body out of contact therewith and attached to said socket means at each end to afford electrical connection between said pair of socket means, said electricity conductor means being of such length as to restrain said thereby interconnected socket means against displacement with respect to said end closure.

3. An electricity conductor unit for seriatim electrical and mechanical interconnection with other units of like characteristics to form a continuous wiring system, comprising the combination with a substantially hollow body having closure means of electrical insulation material at each end thereof, each said closure means comprising separable elements, each having a registering groove which cooperates to provide a passage through said closure means, of a plurality of electricity conducting socket means disposed within and extending through the passages of said end closure means in mutual axial alignment, each such socket means being flanged at its outer end for engagement with said end closure means and having a smooth surface of uniform diameter throughout its length, and electricity conductor means disposed within said hollow body out of contact therewith and connected to each of a pair of axially-registering socket means with minimum of slack to afford mechanical and electrical connection between said pair of socket means and thereby to cause one socket means to anchor its therewith interconnected socket means against outward displacement with respect to said end closure.

4. An electricity conductor unit for seriatim electrical and mechanical interconnection with other units of like characteristics to form a continuous wiring system, comprising the combination with a two-part substantially hollow body of electrical insulation material, each body part including an end wall having registering axial grooves therein to define continuous passages through the end walls of the body when said body parts are assembled, of electricity conducting socket means positioned within each of said continuous passages, each said socket means having at its outer end, an integral circumferential flange engageable with said end closure walls, and electricity conducting wires disposed within said hollow body and connected to one of said socket means at each end of the body to afford mechanical and electrical connection therebetween and secure said socket means against outward displacement with respect to said end walls.

5. An electricity conductor unit for seriatim electrical and mechanical interconnection with other units of like characteristics to form a continuous wiring system, comprising the combination with a two-part substantially hollow body of electrical insulation material, each body part including an end wall having aligned axial grooves therein to define continuous passages through the end walls of the body when said body parts are assembled, of cylindrical electricity conductor means positioned within each of said continuous passages, said electricity conductor means being formed with a continuous flange at an outer end for engagement with said end closure walls, and electricity conducting wires disposed within said hollow body and connected to one of said electricity conductor means at each end of the body to afford electrical and mechanical connection therebetween, said electricity conductor means suspending said interconnecting wires within said body out of contact with the walls of said body.

LOUIS G. MORTEN.